United States Patent
Matsushita (10) Patent No.: US 12,498,013 B2
(45) Date of Patent: Dec. 16, 2025

(54) LIQUID SEALED MOUNT

(71) Applicant: SUBARU CORPORATION, Tokyo (JP)

(72) Inventor: Toshiyuki Matsushita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 261 days.

(21) Appl. No.: 18/113,935

(22) Filed: Feb. 24, 2023

(65) Prior Publication Data

US 2023/0287957 A1  Sep. 14, 2023

(30) Foreign Application Priority Data

Mar. 14, 2022 (JP) ................................. 2022-039342

(51) Int. Cl.
*F16F 13/14* (2006.01)
*F16F 13/10* (2006.01)

(52) U.S. Cl.
CPC ........ *F16F 13/1472* (2013.01); *F16F 13/105* (2013.01); *F16F 13/107* (2013.01); *F16F 13/10* (2013.01); *F16F 2238/04* (2013.01)

(58) Field of Classification Search
CPC ......... F16F 13/10; F16F 13/105; F16F 13/107
USPC .......................... 267/140.13, 140.14, 140.15
See application file for complete search history.

(56) References Cited

U.S. PATENT DOCUMENTS

| 4,893,797 | A | * | 1/1990 | Le Fol | ................... | F16F 13/18 |
| | | | | | | 180/312 |
| 5,411,243 | A | * | 5/1995 | Gennesseaux | ........ | F16F 13/262 |
| | | | | | | 267/140.14 |
| 6,536,113 | B2 | * | 3/2003 | Guillemot | ............. | F16F 13/107 |
| | | | | | | 267/140.13 |

(Continued)

FOREIGN PATENT DOCUMENTS

| JP | S59110441 U | * | 7/1984 | ................ | F16F 5/00 |
| JP | 2007239824 A | * | 9/2007 | | |

(Continued)

OTHER PUBLICATIONS

JP-2007-239824-A. (Year: 2007).*
Japanese Office Action dated Nov. 4, 2025 in Japanese Patent Application No. 2022-039342 with machine English translation.

*Primary Examiner* — Thomas J Williams
(74) *Attorney, Agent, or Firm* — McGinn I.P.Law Group, PLLC (57) ABSTRACT

A liquid sealed mount is to be disposed between a vibration source and a support of the vibration source. The liquid sealed mount includes an elastic portion configured to absorb a vibration from the vibration source, a first liquid chamber and a second liquid chamber from/to which a hydraulic liquid sealed in the elastic portion is to move in response to an expansion and contraction operation of the elastic portion, and a damping passage through which the hydraulic liquid is to move. The damping passage allows the first and second liquid chambers to communicate with each other. A partition member and a valve body are provided in (Continued)

the damping passage. The partition member separates a first passage and a second passage adjacent to each other. The valve body is configured to block the second passage in an openable and closeable manner by using a pressure from the hydraulic liquid.

14 Claims, 6 Drawing Sheets

(56) References Cited

U.S. PATENT DOCUMENTS

| | | | | |
|---|---|---|---|---|
| 7,159,855 B2* | 1/2007 | Tewani | ................ | F16F 13/107 267/140.13 |
| 7,306,210 B2* | 12/2007 | Happou | ................ | F16F 13/262 267/140.13 |
| 9,212,720 B2* | 12/2015 | Satori | ................... | F16F 13/105 |
| 9,222,541 B2* | 12/2015 | Kanaya | ................... | F16F 13/10 |
| 9,341,227 B2* | 5/2016 | Kanaya | ................. | F16F 13/107 |
| 9,970,506 B2* | 5/2018 | Kanaya | ................. | F16F 13/106 |
| 2019/0226549 A1* | 7/2019 | Kojima | ................. | F16F 13/107 |
| 2023/0287957 A1* | 9/2023 | Matsushita | ............. | F16F 13/18 |

FOREIGN PATENT DOCUMENTS

| | | | |
|---|---|---|---|
| JP | 2008-232340 A | | 10/2008 |
| JP | 2009192000 A | * | 8/2009 |
| JP | 2009-299775 A | | 12/2009 |
| JP | 2010-196874 A | | 9/2010 |
| JP | 4974925 B2 | * | 7/2012 |
| JP | 2012-172832 A | | 9/2012 |
| JP | 2016-205606 A | | 12/2016 |
| JP | 2021-063549 A | | 4/2021 |

* cited by examiner

LIQUID SEALED MOUNT

CROSS-REFERENCE TO RELATED APPLICATIONS

The present application claims priority from Japanese Patent Application No. 2022-039342 filed on Mar. 14, 2022, the entire contents of which are hereby incorporated by reference.

BACKGROUND ART

The disclosure relates to a liquid sealed mount.

Figure 5A:
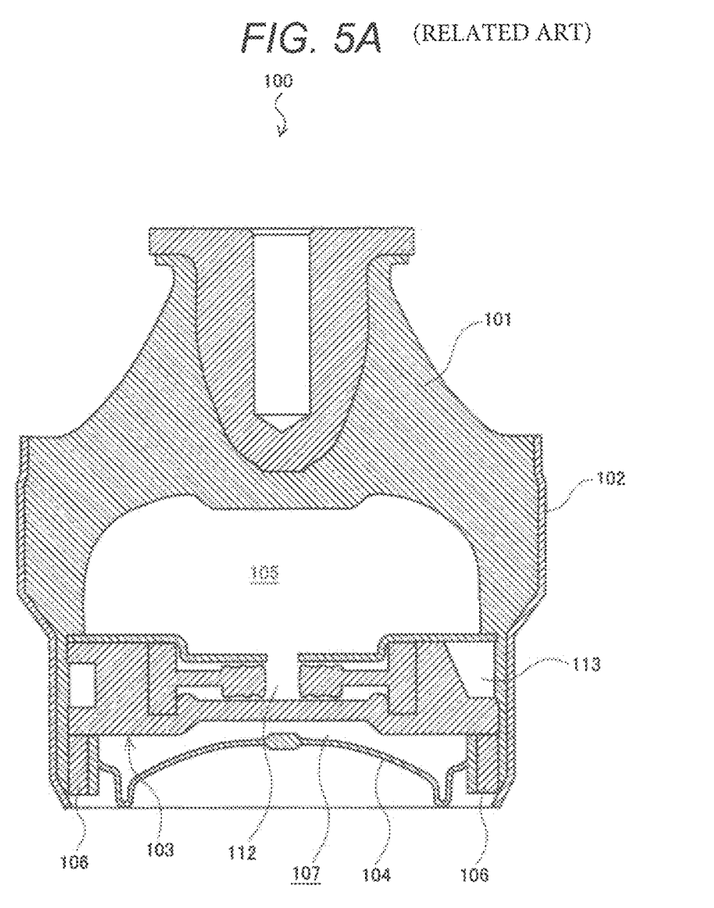
FIG. 5A is a cross-sectional view illustrating a power unit mount in the related art.
Figure 5B:
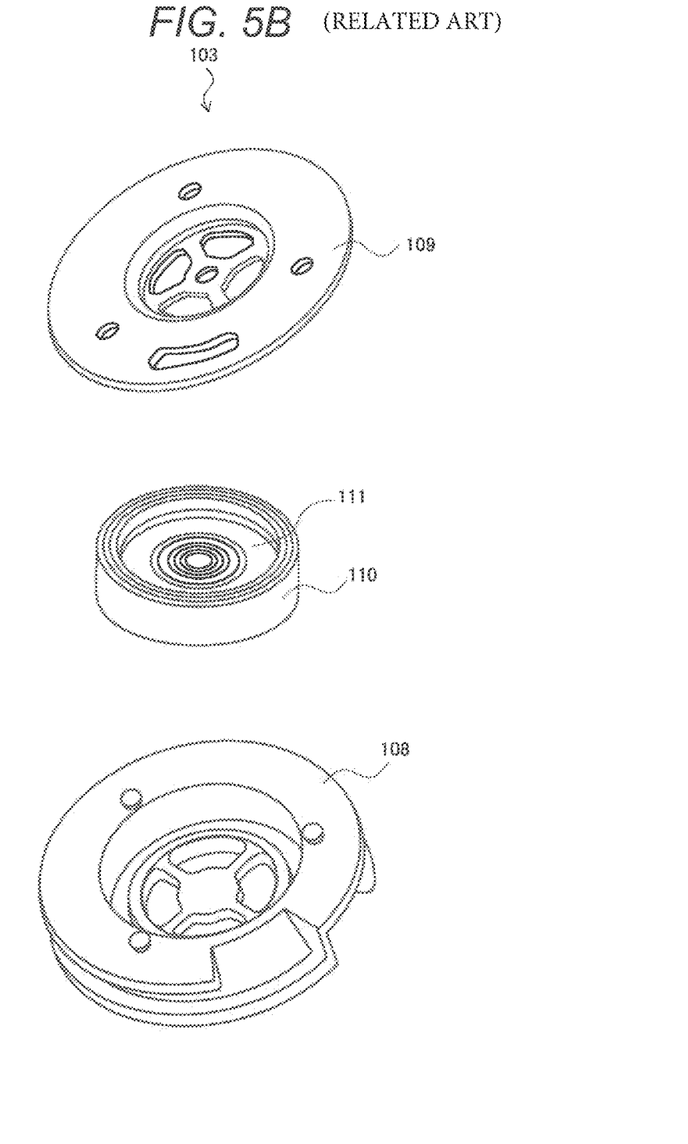
FIG. 5B is an exploded perspective view illustrating the power unit mount in the related art.

A structure illustrated in FIGS. 5A and 5B is known as a liquid sealed mount 100 in the related art (for example, see Japanese Unexamined Patent Application Publication No. 2016-205606). FIG. 5A is a cross-sectional view illustrating the liquid sealed mount 100 in the related art. FIG. 5B is an exploded perspective view illustrating the liquid sealed mount 100 in the related art.

As illustrated in FIG. 5A, the liquid sealed mount 100 mainly includes an insulator 101, a mounting member 102 that covers a lateral side of the insulator 101, a partition member 103 that is disposed at a lower portion of the insulator 101, and a diaphragm 104 that is disposed below the partition member 103.

The insulator 101 is a rubber elastic member having a substantially truncated conical shape. A recessed portion that is opened downward is formed in the lower portion of the insulator 101, and the partition member 103 is disposed so as to block the recessed portion. A non-compressed hydraulic liquid is sealed in a space of the recessed portion to form a main liquid chamber 105.

The diaphragm 104 is disposed on a bottom surface side of the mounting member 102 via a frame member 106. The hydraulic liquid is sealed in a space between the mounting member 102 and the diaphragm 104 to form a sub-liquid chamber 107.

As illustrated in FIG. 5B, the partition member 103 includes a resin lower holder 108, a resin upper holder 109, and an elastic film member 110 sandwiched between the upper holder 109 and the lower holder 108. An elastic film 111 of the elastic film member 110 is disposed in a state where a gap exists between an upper surface of the lower holder 108 and the elastic film 111, and is elastically deformed toward the lower holder 108 due to a hydraulic pressure in the main liquid chamber 105.

With this structure, in the liquid sealed mount 100, the insulator 101 is elastically deformed due to a vibration, and thus the hydraulic liquid flows through a first orifice passage 112 and a second orifice passage 113 as appropriate.

SUMMARY

An aspect of the disclosure provides a liquid sealed mount to be disposed between a vibration source and a support of the vibration source. The liquid sealed mount includes an elastic portion, a first liquid chamber, a second liquid chamber, and a damping passage. The elastic portion is configured to absorb a vibration from the vibration source. A hydraulic liquid sealed in the elastic portion is to move from/to the first liquid chamber and the second liquid chamber in response to an expansion and contraction operation of the elastic portion. The hydraulic liquid is to move through the damping passage. The damping passage allows the first liquid chamber and the second liquid chamber to communicate with each other. A partition member and a valve body are provided in the damping passage. The partition member separates a first passage and a second passage adjacent to each other. The valve body is configured to block the second passage in an openable and closeable manner by using a pressure from the hydraulic liquid.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

As described above, in the liquid sealed mount 100, the first orifice passage 112 is formed below a center of the main liquid chamber 105, and the second orifice passage 113 is formed below an outer peripheral portion of the main liquid chamber 105. That is, since the first orifice passage 112 and the second orifice passage 113 are formed in regions separated from each other, a structure of the partition member 103 is complicated, there is a problem that it is difficult to reduce a manufacturing cost.

A flow rate of the hydraulic liquid flowing through the first orifice passage 112 is larger than a flow rate of the hydraulic liquid flowing through the second orifice passage 113, and structures of the elastic film member 110 and the elastic film 111 also increase in size. The elastic film 111 has a structure of being elastically deformed by the hydraulic pressure in the main liquid chamber 105. As a result, since the structure of the elastic film 111 is formed according to a large-amplitude vibration generated during traveling on a rough road or the like, the elastic film 111 is less likely to be elastically deformed when a small-amplitude vibration is generated during an idling operation or the like, and there is a problem that it is difficult to adjust a peak of a resonance frequency.

When the small-amplitude vibration is generated during the idling operation or the like, the hydraulic liquid flows through both of the first orifice passage 112 and the second orifice passage 113. As described above, the elastic film member 110 and the lower holder 108 are interposed between the first orifice passage 112 and the second orifice passage 113. With this structure, the first orifice passage 112 and the second orifice passage 113 are separated from each other, and the hydraulic liquid flows in the separated regions, so that there is a problem that it is difficult to adjust the peak of the resonance frequency of the device as a whole.

Further, since the liquid sealed mount 100 has a unique structure in which the first orifice passage 112 and the second orifice passage 113 are separated from each other, there is a problem that it is difficult to improve and use an existing device.

It is desirable to provide a liquid sealed mount that enables fine adjustment of a peak of a resonance frequency while reducing a manufacturing cost, by providing a partition member in a single damping passage to form a first passage and a second passage adjacent to each other.

Hereinafter, a liquid sealed mount 10 according to an embodiment of the disclosure will be described in detail with reference to the drawings. Note that the following description is directed to an illustrative example of the disclosure and not to be construed as limiting to the disclosure. Factors without limitation, including, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In the following description, an up-down direction represents a height direction of a vehicle 11, a left-right direction represents a width direction of the vehicle 11, and a front-rear direction represents a length direction of the vehicle 11.

Figure 1A:
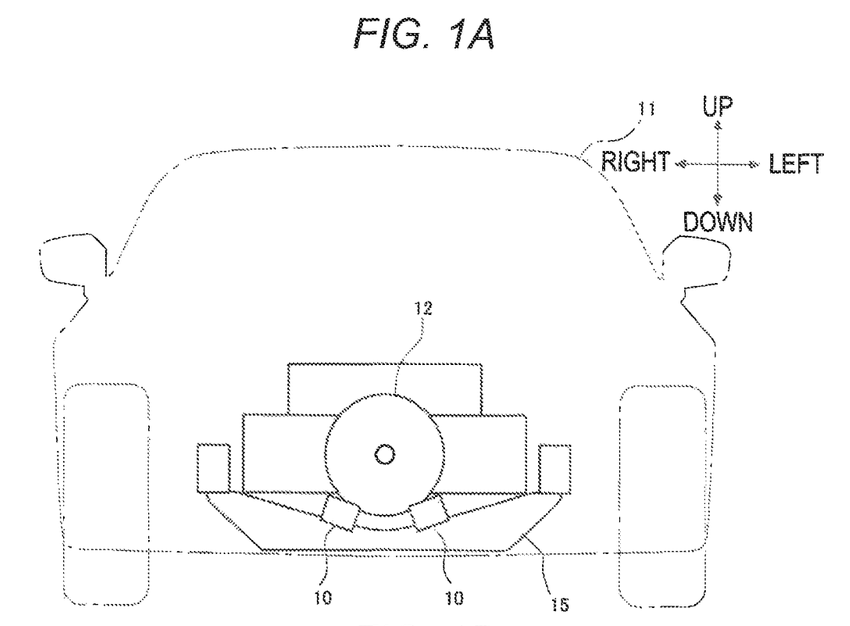
FIG. 1A is a front view illustrating a vehicle including a liquid sealed mount according to an embodiment of the disclosure.
Figure 1B:
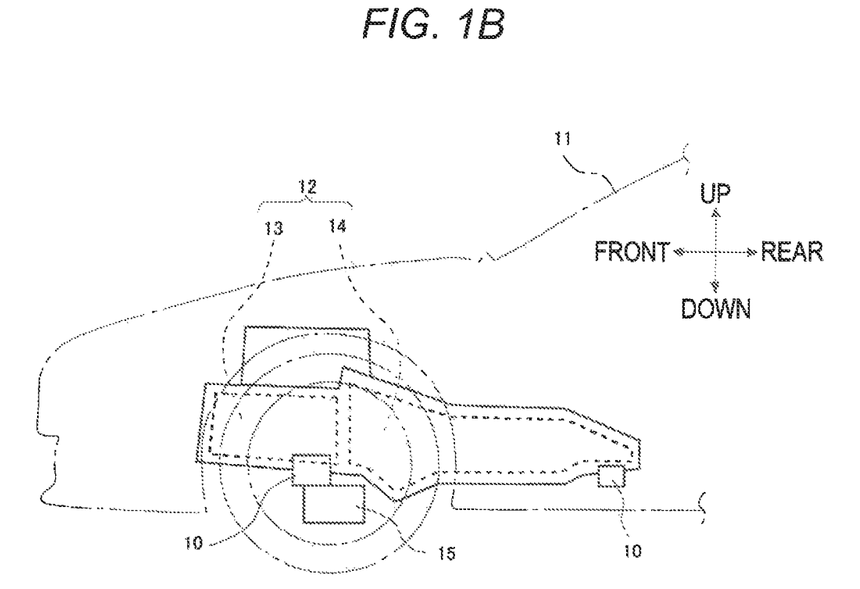
FIG. 1B is a side view illustrating the vehicle including the liquid sealed mount according to the embodiment of the disclosure.
Figure 2A:
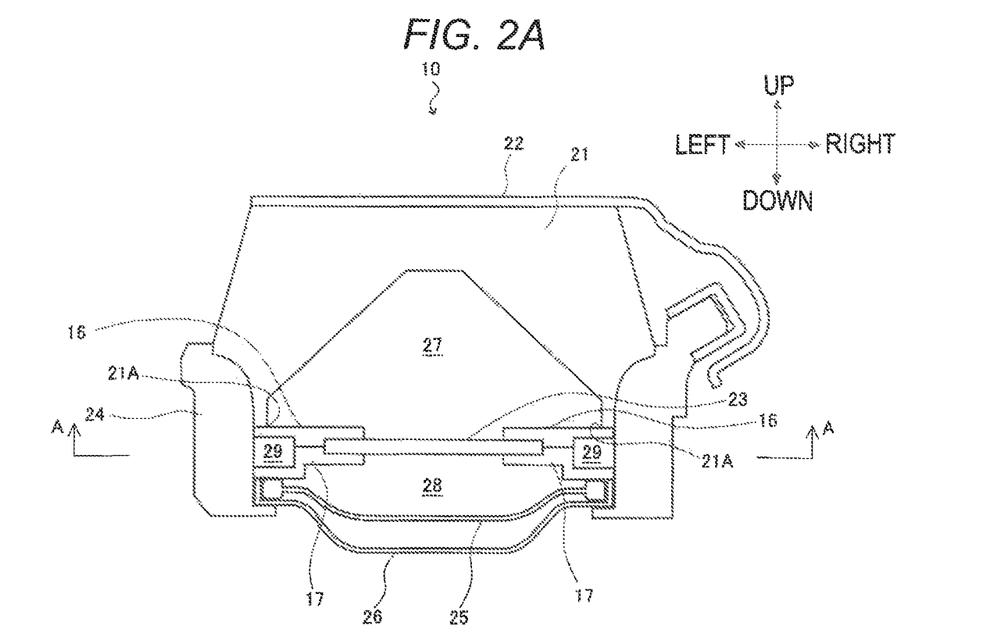
FIG. 2 cross-sectional view illustrating the liquid sealed mount according to the embodiment of the disclosure.
Figure 2B:
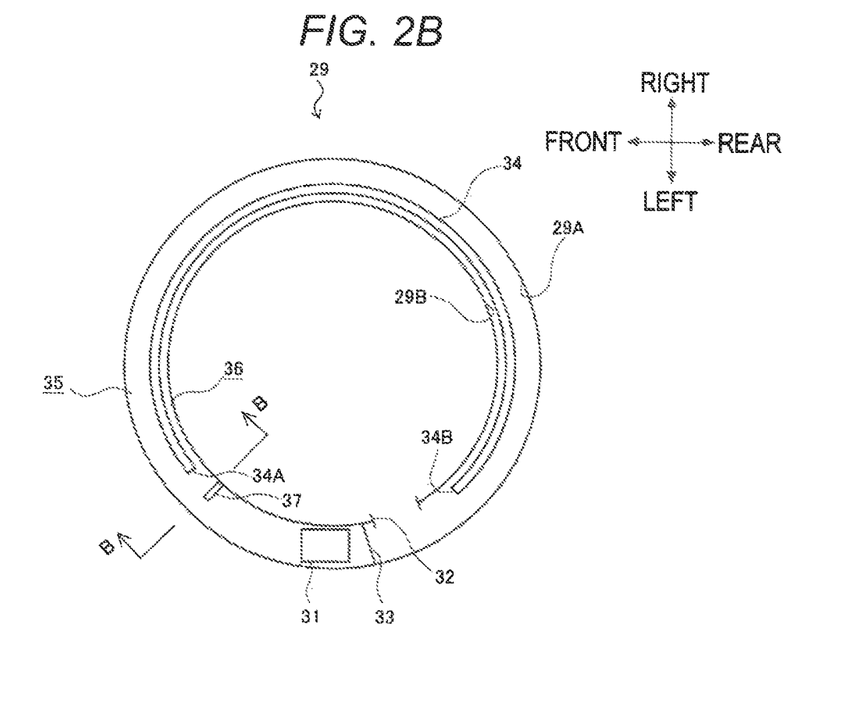
FIG. 2B is a cross-sectional view illustrating a damping passage of the liquid sealed mount according to the embodiment of the disclosure.

FIG. 1A is a front view illustrating the vehicle 11 including the liquid sealed mount 10 according to the embodiment. FIG. 1B is a side view illustrating the vehicle 11 including the liquid sealed mount 10 according to the embodiment. FIG. 2A is a cross-sectional view illustrating the liquid sealed mount 10 according to the embodiment. FIG. 2B is a cross-sectional view illustrating a damping passage 29 of the liquid sealed mount 10 according to the embodiment, taken along a line A-A illustrated in FIG. 2A.

As illustrated in FIGS. 1A and 1B, the vehicle 11 is, for example, an automobile, and a power unit 12 is a power source for driving the vehicle 11. The power unit 12 includes an engine 13, which is an internal combustion engine or the like, and a transmission 14, and is disposed in an engine compartment in a front portion of the vehicle 11. The engine 13 is, for example, a horizontally-opposed engine, and is mounted vertically with a crankshaft (not illustrated) substantially parallel to a travel direction of the vehicle 11. In one embodiment, the power unit 12 may correspond to a "vibration source".

As illustrated in FIGS. 1A and 1B, a cross member 15 extends in a vehicle width direction in the vicinity of a bottom surface of the front portion of the vehicle 11. The cross member 15 is a reinforcing member that constitutes a part of a vehicle body of the vehicle 11, and is a support member that supports the power unit 12 from below. A pair of left and right liquid sealed mounts 10 are disposed on an upper portion of the cross member 15. The two liquid sealed mounts 10 mainly elastically support the engine 13 in the power unit 12 disposed above the liquid sealed mounts 10. In one embodiment, the cross member 15 may correspond to a "support".

That is, the liquid sealed mounts 10 are disposed between the cross member 15 and the power unit 12 and elastically supports the power unit 12. As illustrated in FIG. 1B, the liquid sealed mounts 10 are also disposed on a rear side of the vehicle 11 of the power unit 12. The liquid sealed mounts 10 mainly elastically support the transmission 14 in the power unit 12.

As illustrated in FIG. 2A, the liquid sealed mount 10 mainly includes an insulator 21 made of rubber or the like, an upper bracket 22 joined to an upper portion of the insulator 21, an internal pressure absorption film 23 disposed below a recessed portion of the insulator 21, a lower bracket 24 joined to a lateral side of the insulator 21, a pressure release film 25 disposed below the internal pressure absorption film 23 with a space therebetween, a diaphragm 26 disposed below the pressure release film 25 and disposed at a bottom surface side of the lower bracket 24, a main liquid chamber 27, a sub-liquid chamber 28, and the damping passage 29.

The insulator 21 has a hollow structure having a substantially conical recessed portion inside. The upper bracket 22 and the lower bracket are joined to the insulator 21, and the upper bracket 22 and the lower bracket 24 are coupled to each other via the insulator 21. In one embodiment, the insulator 21 may serve as "elastic portion".

Locking frames 16 and 17 are each formed in an annular shape along an end 21A of the recessed portion of the insulator 21. The locking frames 16 and 17 are permanently affixed by, for example, resin molding. One end side of each of the locking frames 16 and 17 is bonded to the insulator 21, so that the locking frames 16 and 17 are supported by the insulator 21.

The internal pressure absorption film 23 is locked to the locking frames 16 and 17 so as to block a peripheral portion from a central portion of the recessed portion of the insulator 21. That is, the recessed portion of the insulator 21 is blocked by the locking frame 16 and the internal pressure absorption film 23, so that the main liquid chamber 27 is formed inside the insulator 21 in a sealed state. A non-compressed hydraulic liquid is sealed in the main liquid chamber 27. In one embodiment, the main liquid chamber 27 may serve as a "first liquid chamber".

The upper bracket 22 and the lower bracket 24 are each made of, for example, a steel plate. The upper bracket 22 is fastened and fixed to the power unit 12 via bolts and nuts. Meanwhile, the lower bracket 24 is fastened and fixed to the cross member 15 via bolts and nuts.

The pressure release film 25 is disposed below the internal pressure absorption film 23 with a space formed between the pressure release film 25 and the internal pressure absorption film 23. An end side of the pressure release film 25 is in close contact with, for example, the insulator 21, the locking frame 17, and the diaphragm 26. With this structure, the space formed between the internal pressure absorption film 23 and the pressure release film 25 is used as the sub-liquid chamber 28 in a sealed state. A non-compressed hydraulic liquid is sealed in the sub-liquid chamber 28. In one embodiment, the sub-liquid chamber 28 may serve as a "second liquid chamber".

A space surrounded by the locking frames 16 and 17 and the insulator 21 is formed below the end 21A of the insulator 21. The space is annularly formed along the end 21A of the insulator 21, and is used as the damping passage 29.

As will be described in detail later, the locking frame 16 has a first opening 31 (see FIG. 2B) that establishes communication between the main liquid chamber 27 and the damping passage 29. The locking frame 17 has a second opening 32 (see FIG. 2B) that establishes communication between the sub-liquid chamber 28 and the damping passage 29. A non-compressed hydraulic liquid is sealed in the damping passage 29. In FIG. 2A, a partition member 34 (see FIG. 2B) formed in the damping passage 29 is omitted for convenience of description.

The diaphragm 26 is formed as a relatively thin plate-shaped body made of an elastic member such as rubber. The diaphragm 26 is fixed in a state of blocking the bottom surface side of the lower bracket 24.

As illustrated in FIG. 2B, the damping passage 29 is formed below the main liquid chamber 27 and laterally on an outer peripheral side of the sub-liquid chamber 28. The damping passage 29 is formed in an annular shape that is substantially ring-shaped when viewed from above. The locking frame 16 that constitutes a top surface 29C (see FIG. 3A) of the damping passage 29 has the first opening 31 that establishes communication between the main liquid chamber 27 and the damping passage 29. Meanwhile, the locking frame 17 that constitutes an inner peripheral surface 29B of the damping passage 29 has the second opening 32 that establishes communication between the sub-liquid chamber 28 and the damping passage 29. A partition wall 33 is formed between the first opening 31 and the second opening 32 of the damping passage 29.

With this structure, the main liquid chamber 27 and the sub-liquid chamber 28 are in communication with each other through the damping passage 29. The hydraulic liquid, which flows into the damping passage 29 from the first opening 31 or the second opening 32, flows through the damping passage 29 in substantially one circle, and then flows into the main liquid chamber 27 or the sub-liquid chamber 28. When no vibration is applied from the power unit 12 to the liquid sealed mount 10, the hydraulic liquid is in an equilibrium state in the main liquid chamber 27, the sub-liquid chamber 28, and the damping passage 29.

In the liquid sealed mount 10, when a vibration is applied from the power unit 12, the hydraulic liquid is pumped from the main liquid chamber 27 to the damping passage 29 through the first opening 31. The hydraulic liquid in the damping passage 29 flows in the damping passage 29 in a circumferential direction and then flows into the sub-liquid chamber 28 via the second opening 32.

At this time, in the liquid sealed mount 10, the vibration generated in the power unit 12 can be damped using a damping force obtained according to a flow rate of the hydraulic liquid flowing through the damping passage 29. When no vibration is applied from the power unit 12, the hydraulic liquid returns to the equilibrium state.

In the embodiment, as illustrated in FIG. 2B, the partition member 34 is disposed between an outer peripheral surface 29A and the inner peripheral surface 29B of the damping passage 29, and extends in a circumferential direction of the damping passage 29 such that the partition member 34 is substantially parallel to the outer peripheral surface 29A and the inner peripheral surface 29B. A first end 34A of the partition member 34 is located on a first opening 31 side, and a second end 34B of the partition member 34 is located on a second opening 32 side.

Inside the damping passage 29, a main passage 35 and a sub-passage 36 are partitioned by the partition member 34 and are formed adjacent to each other in a radial direction of the damping passage 29. For example, the main passage 35 is located on an outer peripheral surface 29A side, and the sub-passage 36 is located on an inner peripheral surface 29B side.

Further, between the first opening 31 of the damping passage 29 and the end 34A of the partition member 34, a valve body 37 is formed on the inner peripheral surface 29B on a sub-passage 36 side. The valve body 37 is made of, for example, an elastic member such as rubber. As will be described in detail later, the valve body 37 has a structure of being bent by the pressure of the hydraulic liquid, and has a structure that blocks the sub-passage 36 according to a state of the pressure in an openable and closeable manner. The hydraulic liquid pumped from the main liquid chamber 27 flows through the main passage 35 or flows through the main passage 35 and the sub-passage 36 according to a bending amount of the valve body 37.

Next, a passage of the hydraulic liquid flowing inside the damping passage 29 and characteristics of a resonance frequency of vibration in the liquid sealed mount 10 will be described with reference to FIGS. 3A to 4. In this description, reference will be made to the illustration of FIGS. 1A to 2B as appropriate.

Figure 3A:
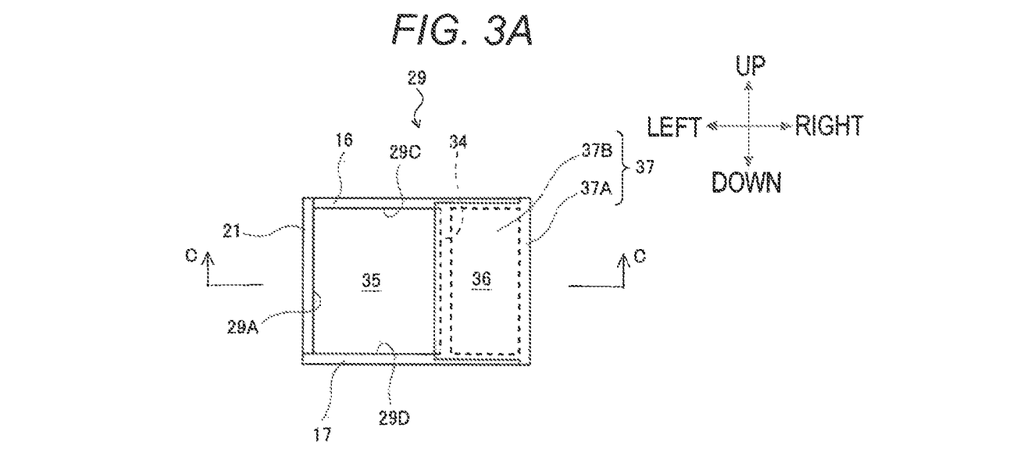
FIG. 3A is a cross-sectional view illustrating the damping passage of the liquid sealed mount according to the embodiment of the disclosure.

FIG. 3A is a cross-sectional view illustrating the damping passage 29 of the liquid sealed mount 10 according to the embodiment, taken along a line B-B illustrated in FIG. 2B. FIGS. 3B and 3C are cross-sectional views illustrating the damping passage 29 of the liquid sealed mount 10 according to the embodiment, taken along a line C-C illustrated in FIG. 3A. FIG. 4 is a characteristic diagram illustrating a resonance frequency of the liquid sealed mount 10 according to the embodiment.

As illustrated in FIG. 3A, a passage cross-section of the damping passage 29 has, for example, a quadrangular shape, and is partitioned into the main passage 35 and the sub-passage 36 by the partition member 34. As described above, the top surface 29C of the damping passage 29 is formed by the locking frame 16, and the inner peripheral surface 29B and a bottom surface 29D of the damping passage 29 are formed by the locking frame 17. The outer peripheral surface 29A of the damping passage 29 is formed by the insulator 21.

The partition member 34 is disposed from the top surface 29C to the bottom surface 29D of the damping passage 29, and is permanently affixed with the locking frames 16 and 17 by integrally molding. A passage area of the main passage 35 and a passage area of the sub-passage 36 can be adjusted according to a position of the partition member 34. In the embodiment, the partition member 34 is formed in the damping passage 29 such that the passage area of the main passage 35 and the passage area of the sub-passage 36 have, for example, a relation of 7:3.

The valve body 37 has, for example, a T-shape in a cross-sectional view, and includes a base portion 37A and a valve portion 37B extending substantially perpendicularly from the base portion 37A. The valve body 37 is made of an elastic member such as rubber, and is permanently affixed with the locking frames 16 and 17 by, for example, insert molding. The base portion 37A is permanently affixed with the locking frame 17. Meanwhile, the valve portion 37B is formed so as to extend from the locking frame 17 toward a damping passage 29 side, and is formed into a shape capable of completely blocking the sub-passage 36.

The liquid sealed mount 10 according to the embodiment has a simple structure in which the partition member 34 and the valve body 37 are permanently affixed with the locking frames 16 and 17 by resin molding, and thus a manufacturing cost is reduced.

Figure 3B:
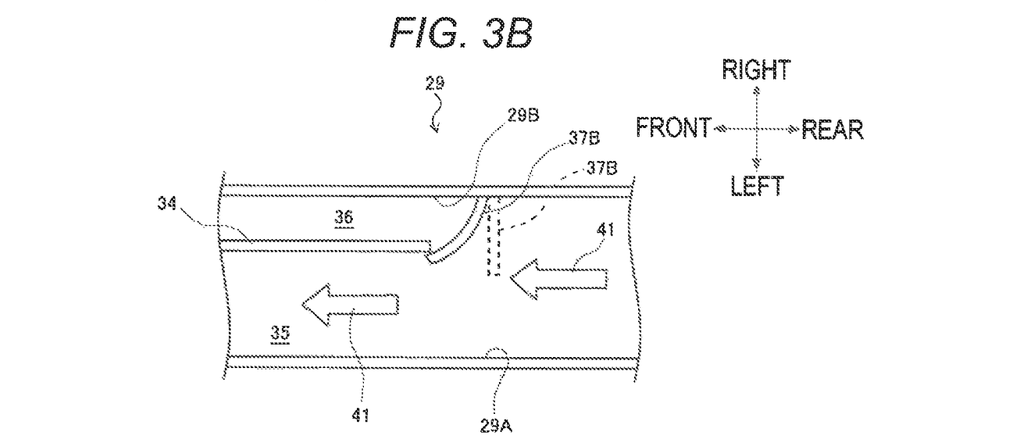
FIG. 3B is a cross-sectional view illustrating the damping passage of the liquid sealed mount according to the embodiment of the disclosure.

FIG. 3B illustrates an operation of the valve body 37 and a flow of the hydraulic liquid in the damping passage 29 when a large input is applied from the power unit 12 to the liquid sealed mount 10. Here, the large input according to the embodiment refers to that a large-amplitude low-frequency vibration generated when the vehicle 11 runs over an obstacle, travels on a rough road, or when the vehicle 11 suddenly accelerates or decelerates, is applied from the power unit 12 to the liquid sealed mount 10.

As illustrated by dotted lines, when no input caused by vibration is applied from the power unit 12 to the liquid sealed mount 10, the hydraulic liquid is in an equilibrium state, and the valve portion 37B of the valve body 37 is in a state of standing in a direction substantially perpendicular to the inner peripheral surface 29B of the damping passage 29.

Meanwhile, when the large input is applied from the power unit 12 to the liquid sealed mount 10, the insulator 21 is elastically deformed to change a volume of the main liquid chamber 27. As indicated by an arrow 41, the hydraulic liquid in the main liquid chamber 27 is pumped into the damping passage 29 via the first opening 31. When receiving a pressure from the hydraulic liquid, the valve portion 37B is bent toward the sub-passage 36 side and pressed against the partition member 34. As a result, the sub-passage 36 is blocked by the valve portion 37B, and the hydraulic liquid flows through the main passage 35 and flows into the sub-liquid chamber 28 via the second opening 32.

Figure 4:
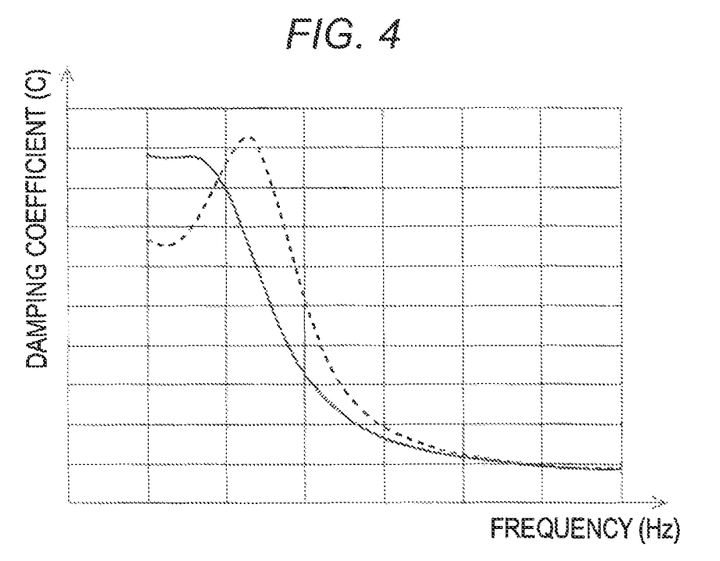
FIG. 4 is a characteristic diagram illustrating a resonance frequency of the liquid sealed mount according to the embodiment of the disclosure.

Here, FIG. 4 illustrates characteristics of the resonance frequency generated in the damping passage 29 of the liquid sealed mount 10 at the time of a large input, a vertical axis indicates a damping coefficient, and a horizontal axis indicates a frequency. A solid line indicates a case where a flow rate of the hydraulic liquid flowing through the damping passage 29 is not adjusted, that is, a case where the valve body 37 is not provided and the hydraulic liquid flows through the main passage 35 and the sub-passage 36. Meanwhile, a one-dotted chain line indicates a case where the sub-passage 36 is blocked by the valve body 37, and the hydraulic liquid flows through the main passage 35.

When a large input is applied to the liquid sealed mount 10, since the sub-passage 36 is blocked by the valve body 37, the hydraulic liquid flows through the main passage 35 in the damping passage 29. As a result, the flow rate of the hydraulic liquid flowing through the damping passage 29 is reduced, so that a peak of the resonance frequency of the liquid sealed mount 10 transitions high as indicated by the one-dotted chain line.

As described above, in the liquid sealed mount 10, the peak of the resonance frequency in the damping passage 29 is adjusted, for example, from an initial setting value of about 8 Hz to about 12 Hz, by reducing the flow rate of the hydraulic liquid flowing in the damping passage 29 to about 7/10. As a result, the low-frequency vibration input from the power unit 12 to the liquid sealed mount 10 is damped by liquid column resonance generated in the damping passage 29. Then, the vibration of the vehicle 11 is reduced to prevent an occupant from feeling uncomfortable.

Figure 3C:
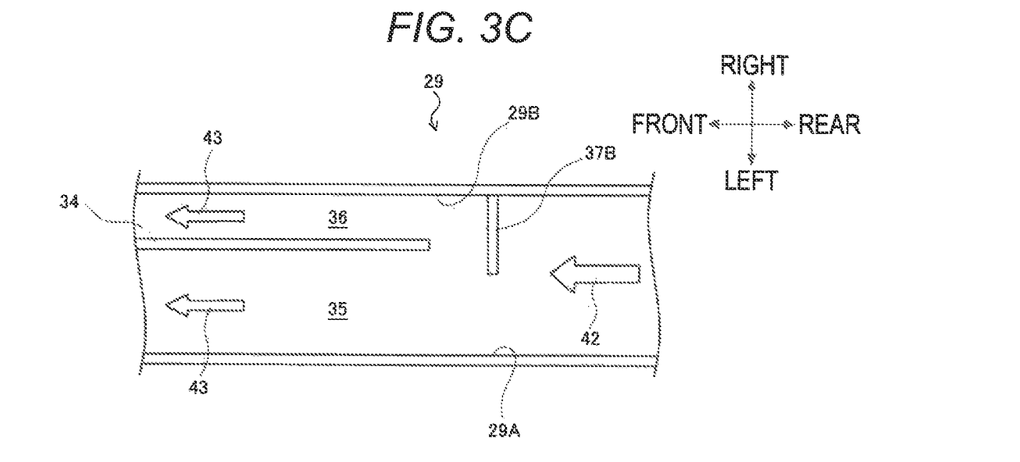
FIG. 3C is a cross-sectional view illustrating the damping passage of the liquid sealed mount according to the embodiment of the disclosure.

FIG. 3C illustrates an operation of the valve body 37 and a flow of the hydraulic liquid in the damping passage 29 when a small input is applied from the power unit 12 to the liquid sealed mount 10. Here, the small input according to the embodiment refers to that a small-amplitude high-frequency vibration, such as a vibration of the engine 13 generated during idling of the vehicle 11, is applied from the power unit 12 to the liquid sealed mount 10.

As illustrated in FIG. 3C, when the small input is applied from the power unit 12 to the liquid sealed mount 10, the insulator 21 is slightly elastically deformed, and the hydraulic liquid in the main liquid chamber 27 is pumped into the damping passage 29 via the first opening 31, as indicated by an arrow 42.

As described above, a hardness, a shape such as a thickness, and the like of the valve portion 37B of the valve body 37 is designed such that the valve portion 37B is bent toward a partition member 34 side and blocks the sub-passage 36 due to a pressure received from the hydraulic liquid at the time of the large input. Therefore, the valve portion 37B is bent slightly toward the partition member 34 side or maintains the state of standing in the direction substantially perpendicular to the inner peripheral surface 29B of the damping passage 29, due to a pressure received from the hydraulic liquid at the time of the small input.

With this structure, as indicated by an arrow 43, the hydraulic liquid flowing from the main liquid chamber 27 flows through the main passage 35 and the sub-passage 36, and flows into the sub-liquid chamber 28 via the second opening 32. That is, although the hydraulic liquid receives a slight passage resistance due to the valve portion 37B of the valve body 37, the hydraulic liquid flows through all of the passages of the damping passage 29 and thus the flow rate of the hydraulic liquid is not reduced. As a result, the flow rate of the hydraulic liquid flowing through the damping passage 29 is the same or hardly changes, and the peak of the resonance frequency maintains at the initial setting value.

At this time, in the liquid sealed mount 10, the main passage 35 and the sub-passage 36 are disposed adjacent to each other inside the damping passage 29. The hydraulic liquid flows through the damping passage 29 rather than flowing through remotely separated passages, within the liquid sealed mount 10. As a result, the peak of the resonance frequency does not deviate greatly from the initial setting value, and the peak can be finely adjusted, so that a stable damping effect can be obtained in the liquid sealed mount 10.

Here, as a characteristic of the liquid sealed mount 10, at the time of a large-amplitude vibration generated when the large input is applied, the higher the peak of the resonance frequency, the more effectively the vibration is reduced. Meanwhile, at the time of a small-amplitude vibration generated when the small input is applied, the lower the peak of the resonance frequency, the more effectively the vibration is reduced. That is, since conditions for the peaks of the resonance frequencies at the time of the large-amplitude vibration and at the time of the small-amplitude vibration are opposite to each other, it is difficult for one liquid sealed mount 10 to cope with two types of vibrations at an optimum initial setting.

Therefore, in the liquid sealed mount 10 according to the embodiment, even when a characteristic of reducing the vibration at the time of the small-amplitude vibration is prioritized at the time of the initial setting, the flow rate of the hydraulic liquid in the damping passage 29 can be adjusted and an effect of reducing the vibration even for the large-amplitude vibration is improved by adopting a structure in which the sub-passage 36 can be blocked by the valve body 37.

In the liquid sealed mount 10, by adjusting an installation position of the partition member 34 in the damping passage 29 at the time of the initial setting, the passage area of the main passage 35 and the passage area of the sub-passage 36 can be adjusted. As described above, since the peak of the resonance frequency is adjusted according to the flow rate of the hydraulic liquid flowing through the damping passage 29, it is also possible to finely adjust the peak of the resonance frequency according to characteristics of a vehicle such as a vehicle having excellent rough road traveling performance.

Further, by adjusting the shape of the valve portion 37B of the valve body 37, it is possible to adjust a bending amount with respect to the pressure received from the hydraulic liquid and to adjust how the sub-passage 36 is blocked. For example, when the valve portion 37B has a shape of a Japanese hiragana character "Ku" in a cross section in a longitudinal direction, and a tip end of the valve body 37 approaches the partition member 34, the sub-passage 36 is easily blocked. By shortening a length of the valve portion 37B, the time to block the sub-passage 36 is shortened, and responsiveness to the input is improved. Further, by making a shape of the valve portion 37B triangular in the cross-section in the longitudinal direction, the valve portion 37B can be hardly bent.

An intermediate input between the large input and the small input may be applied to the liquid sealed mount 10. The medium input according to the embodiment refers to that a medium-amplitude medium-frequency vibration generated when the vehicle 11 travels in a town, is applied from the power unit 12 to the liquid sealed mount 10. As described above, since the valve portion 37B is easily bent, when a medium-frequency vibration is applied to the liquid sealed mount 10, the sub-passage 36 is blocked, and thus the peak of the resonance frequency is adjusted and the effect of reducing the vibration is improved.

In the embodiment, a case where the partition member 34 is disposed between the outer peripheral surface 29A and the inner peripheral surface 29B in the damping passage 29 of the liquid sealed mount 10, and the main passage 35 is formed adjacent to an outside of the sub-passage 36 has been described, but the disclosure is not limited thereto. For example, the partition member 34 may be disposed between the bottom surface 29D and the top surface 29C of the damping passage 29, and the main passage 35 and the sub-passage 36 may be formed adjacent to each other in a vertical direction of the damping passage 29. In this case, the same effect as that described above can also be obtained by making the sub-passage 36 have a structure of being appropriately blocked by the valve portion 37B of the valve body 37.

A case where the partition member 34 is permanently affixed with the locking frames 16 and 17 has been described, but the disclosure is not limited thereto. For example, the partition member 34 may be formed separately from the locking frames 16 and 17. In this case, the partition member 34 may also be disposed to the damping passage 29 of an existing liquid sealed mount later. The manufacturing cost can also be reduced by improving and using the existing liquid sealed mount. In addition, various modifications and alterations can be made without departing from the gist of the disclosure.

A liquid sealed mount of the disclosure includes a first liquid chamber, a second liquid chamber, and a damping passage that establishes communication between the first liquid chamber and the second liquid chamber. The damping passage is partitioned into a first passage and a second passage by a partition member, and a valve body is disposed inside the damping passage and at a position where the second passage is blocked in an openable and closeable manner. With this structure, when a vibration is applied to the liquid sealed mount from a vibration source, a flow rate of a hydraulic liquid flowing through the inside of the damping passage is adjusted by a valve body. Further, by adjusting a peak of a resonance frequency of the liquid sealed mount according to the flow rate, a damping effect for vibrations of various magnitudes can be improved in one liquid sealed mount.

The invention claimed is:

1. A liquid sealed mount to be disposed between a vibration source and a support of the vibration source, the liquid sealed mount comprising:
   an elastic portion configured to absorb a vibration from the vibration source;
   a first liquid chamber and a second liquid chamber from/to which a hydraulic liquid sealed in the elastic portion is to move in response to an expansion and contraction operation of the elastic portion; and
   a damping passage through which the hydraulic liquid is to move, the damping passage allowing the first liquid chamber and the second liquid chamber to communicate with each other, wherein
   a partition member and a valve body are provided in the damping passage, the partition member separating a first passage and a second passage adjacent to each other, the valve body includes one end fixed on an inner peripheral surface of the damping passage and another end extending toward the partition member, the valve body being configured to block the second passage in an openable and closeable manner by using a pressure from the hydraulic liquid, and
   wherein the partition member is disposed between an outer peripheral surface and the inner peripheral surface of the damping passage, and extends in a circumferential direction of the damping passage such that the partition member is substantially parallel to the outer peripheral surface and the inner peripheral surface.

2. The liquid sealed mount according to claim 1, wherein the damping passage has an annular shape, and
   the first passage and the second passage extend along the circumferential direction of the damping passage.

3. The liquid sealed mount according to claim 1, wherein the damping passage includes
   a first opening communicating with the first liquid chamber, and
   a second opening communicating with the second liquid chamber,
   a partition wall is provided between the first opening and the second opening in the damping passage, and
   the valve body is provided between the first opening and the partition member.

4. The liquid sealed mount according to claim 2, wherein the damping passage includes
   a first opening communicating with the first liquid chamber, and
   a second opening communicating with the second liquid chamber,
   a partition wall is provided between the first opening and the second opening in the damping passage, and
   the valve body is provided between the first opening and the partition member.

5. The liquid sealed mount according to claim 1, wherein the first passage and the second passage are disposed adjacent to each other inside the damping passage, a passage area of the second passage is configured to be adjustable.

6. The liquid sealed mount according to claim 1, wherein the damping passage formed below the first liquid chamber and laterally on an outer peripheral side of the second liquid chamber.

7. The liquid sealed mount according to claim 3, wherein a locking frame that constitutes a top surface of the damping passage includes the first opening.

8. The liquid sealed mount according to claim 1, wherein inside the damping passage, a main passage and a sub-passage are partitioned by the partition member and are formed adjacent to each other in a radial direction of the damping passage, and
wherein the value body includes a base fixed to the inner peripheral surface of the damping passage that is substantially perpendicular with the partition member.

9. The vehicle comprising the liquid sealed mount according to claim 1, wherein a passage area of the first passage and the second passage are configured to the adjustable according to a positioning of the partition member, and
wherein when the hydraulic liquid is in an equilibrium state, and a valve portion of the valve body is in a state of standing in a direction substantially perpendicular to the inner peripheral surface of the damping passage.

10. A vehicle comprising the liquid sealed mount according to claim 1.

11. A liquid sealed mount to be disposed between a vibration source and a support of the vibration source, the liquid sealed mount comprising:
an elastic portion configured to absorb a vibration from the vibration source;
a first liquid chamber and a second liquid chamber from/to which a hydraulic liquid sealed in the elastic portion is to move in response to an expansion and contraction operation of the elastic portion; and
a damping passage through which the hydraulic liquid is to move, the damping passage allowing the first liquid chamber and the second liquid chamber to communicate with each other, wherein
a partition member and a valve body are provided in the damping passage, the partition member separating a first passage and a second passage adjacent to each other, the valve body includes one end fixed on an inner peripheral surface of the damping passage and another end extending toward the partition member, the valve body being configured to block the second passage in an openable and closeable manner by using a pressure from the hydraulic liquid,
wherein a first end of the partition member is disposed on a first opening side of the damping passage, and a second end of the partition member is disposed on a second opening side of the damping passage.

12. A liquid sealed mount disposed between a vibration source and a support of the vibration source, the liquid sealed mount comprising:
an elastic portion configured to absorb a vibration from the vibration source;
a first liquid chamber and a second liquid chamber from/to which a hydraulic liquid sealed in the elastic portion is to move in response to an expansion and contraction operation of the elastic portion; and
a damping passage through which the hydraulic liquid is to move, the damping passage allowing the first liquid chamber and the second liquid chamber to communicate with each other, wherein
a partition member and a valve body are provided in the damping passage, the partition member separating a first passage and a second passage, the valve body includes one end fixed on an inner peripheral surface of the damping passage and another end extending toward the partition member, the valve body being configured to adjustably control the second passage according to a pressure from the hydraulic liquid, and
wherein the first passage and the second passage are disposed adjacent to each other inside the damping passage, a passage area of the second passage is configured to be adjustable, and
wherein when the hydraulic liquid is in an equilibrium state, and a valve portion of the valve body is in a state of standing in a direction substantially perpendicular to the inner peripheral surface of the damping passage.

13. The liquid sealed mount according to claim 12, wherein
the damping passage has an annular shape, and
the first passage and the second passage extend along a circumferential direction of the damping passage.

14. The liquid sealed mount according to claim 12, wherein
the damping passage includes
a first opening communicating with the first liquid chamber, and
a second opening communicating with the second liquid chamber,
a partition wall is provided between the first opening and the second opening in the damping passage, and
the valve body is provided between the first opening and the partition member.

* * * * *